No. 690,710. Patented Jan. 7, 1902.
W. ERNY.
GALVANIC BATTERY.
(Application filed Mar. 6, 1901.)
(No Model.)
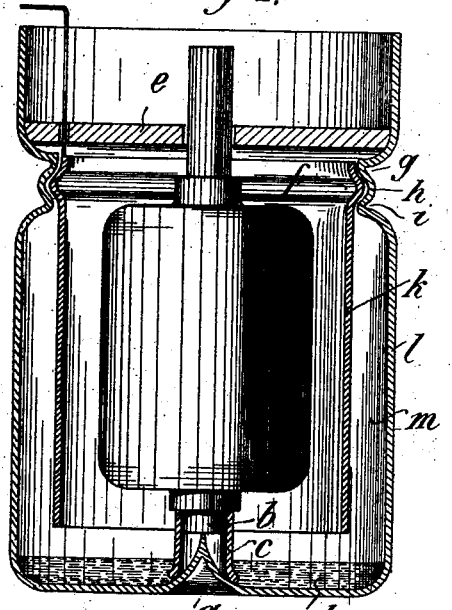
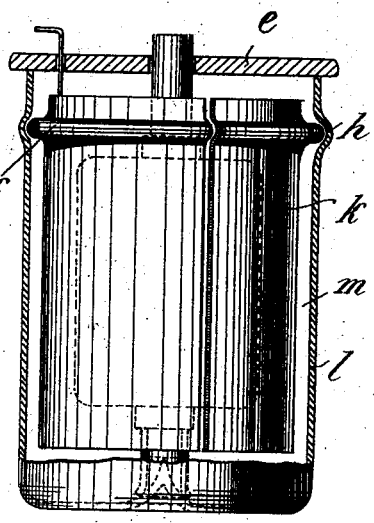
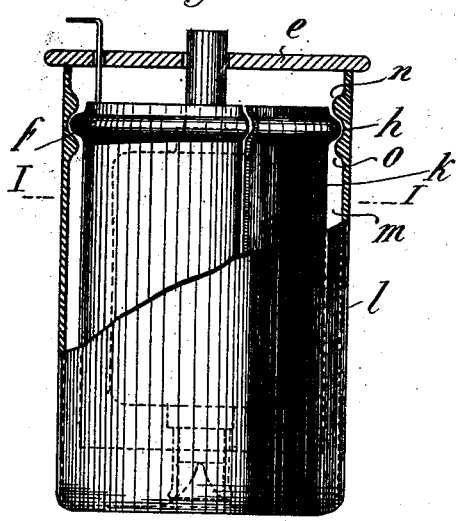
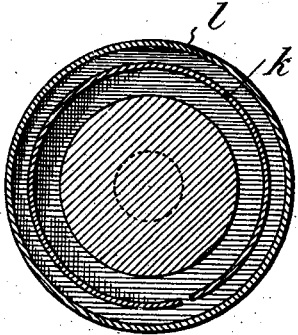
Witnesses
Katherine E. Manning
Jno R Adams
Inventor
Wilhelm Erny
By Knight Bro
Attorneys

UNITED STATES PATENT OFFICE.

WILHELM ERNY, OF HALLE-ON-THE-SAALE, GERMANY.

GALVANIC BATTERY.

SPECIFICATION forming part of Letters Patent No. 690,710, dated January 7, 1902.

Application filed March 6, 1901. Serial No. 50,082. (No model.)

*To all whom it may concern:*

Be it known that I, WILHELM ERNY, electrical engineer, a subject of the Emperor of Germany, and a resident of Blucherstrasse 10, Halle-on-the-Saale, in the Kingdom of Prussia and Empire of Germany, have invented certain new and useful Improvements in Galvanic Batteries, of which the following is a specification.

The present invention relates to improvements in galvanic batteries as regards the arrangement of the two electrodes in the cells thereof.

Figure 1 is a longitudinal section of a cell embodying my invention, parts being in elevation. Fig. 2 is a detail view of the carbon electrode and its supporting-tube. Figs. 3 and 4 are views, similar to Fig. 1, of modifications. Fig. 5 is a transverse section showing the split ring.

As will be seen from the longitudinal section according to Fig. 1, the cell $l$ is provided with two parallel contractions $g$ and $i$, so that inside the cell an annular recess $n$ is formed. The zinc electrode $k$, which consists of a cylinder with a longitudinal slot, is provided at its upper end with an annular projection which enters the recess $h$ of the glass or receptacle of the cell. The zinc electrode is thus held suspended in the receptacle, so that its lower end cannot come into contact with the bottom of the said receptacle, and the concentric space $m$ between the said zinc electrode and the receptacle thus remains free.

The form of construction according to Fig. 1 is of special advantage in so-called "wet" batteries.

According to Fig. 3 the receptacle or glass of the cell is only provided with a recess $h$, which is engaged by the collar or projection $f$ of the zinc electrode. However, in order to secure a free space $m$ between the zinc electrode and the receptacle the said collar or projection $f$ must be of suitable size.

According to Fig. 4 the receptacle is provided on its inner side with two solid annular ridges $n$ and $o$, so that between same the annular recess $h$ is produced, into which latter the collar $f$ of the zinc electrode enters.

The forms of construction according to Figs. 3 and 4 are of special advantage in dry batteries.

The bottom of the receptacle is provided in the center with a conical projection $a$, while the carbon electrode $b$ carries at its lower end a short india-rubber tube $c$, as shown in Fig. 2. The carbon electrode is so inserted in the receptacle that, as shown in the drawings, the india-rubber tube $c$ passes over the conical projection, by which means the lower end of the carbon is protected against zinc deposited accumulating on the bottom of the receptacle.

The element is closed in the usual manner by means of a cover $e$.

Having thus described my invention, the following is what I claim as new therein and desire to secure by Letters Patent:

1. A galvanic battery having a vessel provided with an inner annular recess and a zinc electrode which consists of a slotted cylinder, with an outer projection at its upper end, the said projection engaging the said groove, so that the zinc electrode is freely suspended in the vessel.

2. A galvanic battery, having a vessel provided with an inner annular recess and a zinc electrode which consists of a slotted cylinder, with an outer projection at its upper end, the said projection engaging the said groove, a conical elevation on the bottom of the cell, and a carbon electrode, the lower end of which is provided with an india-rubber tube adapted to fit over said conical elevation.

In witness whereof I have hereunto set my hand in presence of two witnesses.

WILHELM ERNY.

Witnesses:
WOLDEMAR HAUPT,
HENRY HASPER.